Feb. 10, 1953 W. K. ZIEGELMAN 2,628,192
APPARATUS FOR REGENERATING WATER SOFTENERS
Filed Aug. 25, 1948
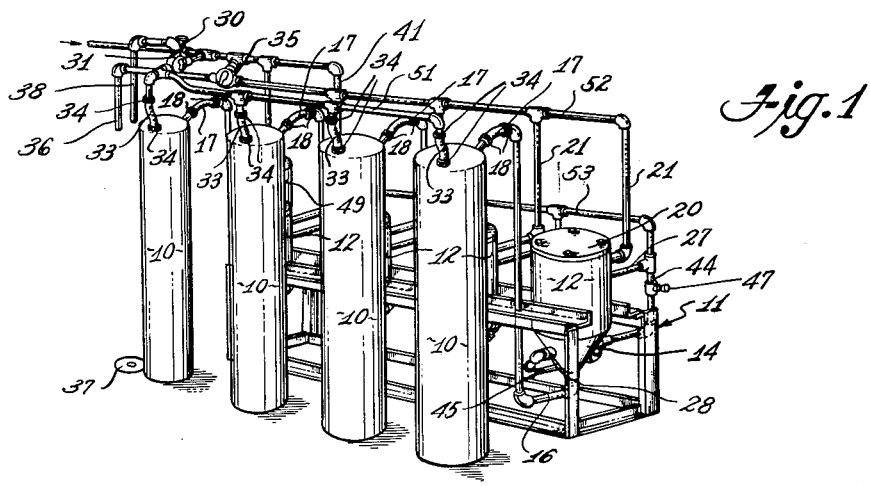
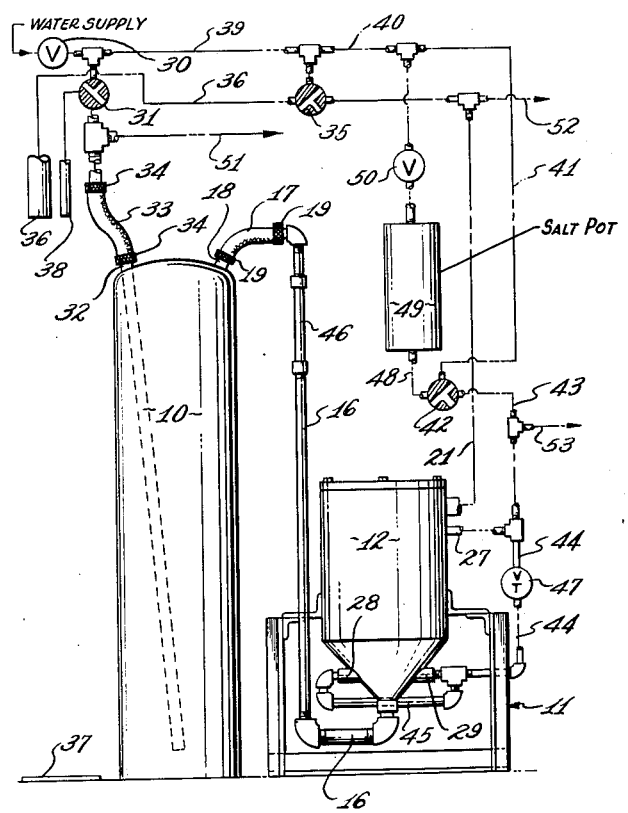
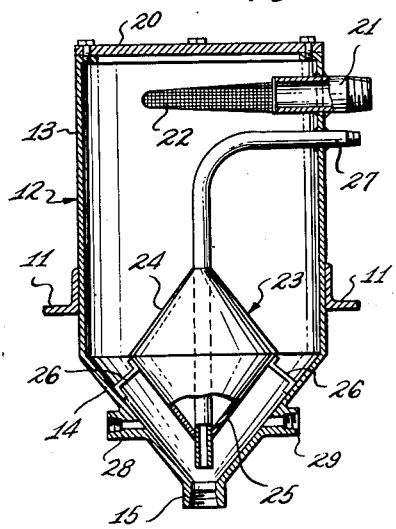
INVENTOR.
WESLEY K. ZIEGELMAN
BY
Walter P. Huntley
Attorney Patented Feb. 10, 1953

2,628,192

UNITED STATES PATENT OFFICE 2,628,192

APPARATUS FOR REGENERATING WATER SOFTENERS

Wesley K. Ziegelman, Los Angeles, Calif.

Application August 25, 1948, Serial No. 46,114

4 Claims. (Cl. 210—24)

This invention relates to a method and apparatus for regenerating water softeners, and has particular reference to a method and apparatus for quickly rejuvenating a plurality of water softeners of the zeolite type.

In the field of domestic water softening, it has for some time been the practice to sell a water softening service which provides an individual softener of the zeolite type at each customer's home. Periodically, and before the zeolite is exhausted, the used softener is exchanged for a freshly regenerated unit, and the used softener is taken to a central station where, in company with other softeners from other homes, it is regenerated and sent out to replace another used unit at a different location. By this means it is possible to provide each customer with a continuous water softening service at a very reasonable rate.

United States Patent No. 2,252,065, issued August 2, 1941, to Emmett J. Culligan, describes this service in detail and discloses a method and apparatus for regenerating water softeners at a central station. The method of handling and regenerating the spent softeners which is described in that patent, although currently in general use, is attended by numerous disadvantages. The patented procedure was devised on the theory that the cost of the salt used in the regenerating process is a critical factor in the cost of the service. It has been found that this is not true, but that because of the large volume of business handled, the critical factors relate to the labor and time costs—that it is more important to effect the regeneration in as short a time as possible and with a minimum of handling of the softeners than it is to save a few pounds of salt.

The present invention is directed to an improvement of the Culligan system and has for one of its objects the provision of a water softener regenerating method and apparatus which reduces to a minimum the time required to effect the rejuvenation and the amount of handling of the softeners which attends the regenerating process.

It is also an object of this invention to provide a method and apparatus of the character set forth in the preceding paragraph which includes the necessary instrumentalities and method steps for washing, salting, and rinsing a zeolite water softener without requiring the softener to be moved or disconnected during the process.

It is a still further object of this invention to provide an apparatus for use in the regeneration of water softeners which includes a washing tank so connected to the softener as to permit at least a part of the zeolite to be transferred to the tank and there washed to remove entrapped solid materials.

It is also an object of this invention to provide a water softener regenerating apparatus of the character set forth in the preceding paragraph which includes an injector means for returning the zeolite to the softener at the conclusion of the washing operation.

Other objects and advantages of this invention will be apparent from a study of the following specification read in connection with the accompanying drawings, wherein:

Fig. 1 is a perspective view illustrating the appearance and general arrangement of the preferred embodiment of this invention, and showing a plurality of softeners connected for simultaneous regeneration;

Fig. 2 is a side elevational view of a part of the apparatus, illustrating by diagrammatic means the arrangement of the piping interconnecting parts of the apparatus; and Fig. 3 is a vertical sectional view through the washing tank portion of the apparatus illustrating the construction of the injector.

Referring to the drawings, there is illustrated in Fig. 1 the preferred embodiment of the invention as arranged for the simultaneous regeneration of a plurality of water softeners 10 of the zeolite type. Fig. 1 illustrates the apparatus as being arranged to treat four softeners simultaneously, but it will be understood that the apparatus may be arranged to treat a smaller or larger number of the softeners 10, as desired.

The regenerating apparatus comprises a suitable supporting frame 11 upon which are mounted a plurality of washing tanks 12, there being provided a separate tank 12 for each of the softeners 10. The tanks 12 are connected to the associated softeners by the piping shown as will be described in detail hereinafter.

The washing tanks 12 are preferably constructed as illustrated in detail in Fig. 3 and comprise a cylindrical upper portion 13 from which depends a conical portion 14 terminating in a suitable pipe or conduit connection 15. From the connection 15, a pipe or tube 16 extends outwardly and upwardly and is connected by means of a hose or flexible tube 17 to the inlet connection 18 of the softener 10. The hose 17 is preferably fitted with quick-acting connectors 19 to facilitate the operation of connecting and disconnecting the softener.

The top of the tank 12 is closed by means of a pressure tight closure 20, below which is disposed an outlet pipe 21, suitably secured to the tank portion 13 as by welding and communicating with the interior thereof. The inadvertant discharge of relatively large solid particles through the outlet pipe 21 is prevented by means of a screen 22. In the lower portion of the tank, there is disposed a baffle member 23 formed of two cone shaped portions 24 and 25 placed base to base. The baffle member 23 is supported within the tank by means of supports 26 in such position that the sides of the lower portion 25 thereof substantially parallels the cone shaped lower portion 14 of the tank. In accordance with the preferred form of this invention, the space between the portion 14 and the lower part 25 of the baffle member is of the order of three fourths of an inch.

At a convenient location above the baffle member 24, as for example just below the outlet pipe 21, there is disposed an injector pipe 27. As is shown, the injector pipe 27 passes downwardly through the baffle member 23 and terminates just above the conduit connection 15. A suitable spacing between the lower end of the injector pipe and the connection 15 is of the order of one fourth of an inch. Also a suitable location near the lower end of the baffle member 23, and at diametrically opposite locations, there is disposed a pair of agitator connections 28 and 29 communicating with the space between the tank and the baffle member 23 and including suitable means for the attachment thereto of pipe or tubing lines.

The washing tank 12 is associated with a piping system connecting the tank to a supply of water under pressure and to its associated softener 10. Control means connected into the piping system is arranged to flush out the softener with clear water and wash the zeolite bed to remove entrapped solid materials such as algae, silt, and rust; treat the zeolite with a sodium chloride solution to replace with sodium ions the calcium and magnesium ions picked up during the service use of the softener; and then rinse the zeolite with clear water to remove any excess of salt remaining in the softener.

Fig. 2 illustrates the piping and control equipment as including a main shut-off valve 30 connected to a suitable supply of water under pressure such as is provided by the usual domestic water supply system. The valve 30 is connected to a three-way valve 31 arranged in one position to connect the water supply to the outlet 32 of the softener 10, this connection being afforded by means of a hose or flexible tubing 33 equipped with quick-acting connectors 34. When the valve 30 is opened, and the valve 31 is turned to the position mentioned, water is forced into the softener through the normal outlet 32, through the softener and out through the normal inlet 18. The water passing through the softener flows through the pipe 16 and into the tank 12, and as the flow continues the tank 12 is filled and the water begins to be discharged through the outlet pipe 21.

The outlet pipe 21 is connected to a three-way valve 35 which is turned to a position connecting the pipe 21 to a drain line 36 which may be terminated above a floor drain 37 or other means suitable for the disposition of waste water. The reverse flow of water through the softener 10 serves to wash out solid material which has been trapped in the softener. This material is flushed through the tank 12 and discharged from the drain line 36. As the flow continues, the bed of zeolite in the softener is agitated and loosened. Since the zeolite is a very light granular material resembling coarse white sand in appearance a part is caught in the flow and carried through the pipe 16 and into the tank 12 where it is further agitated and washed by the water flowing through the tank. This expansion of the zeolite usually continues until from one third to one half of the zeolite has been transferred to the tank 12. The washing process is continued for a sufficient length of time to completely flush away all of the entrapped solid materials, a period usually ranging from five to ten minutes, during which time the zeolite is held within the wash tank 12 and prevented from escaping therefrom by the screen 22.

When the washing process is completed, the three-way valve 31 is turned to the other position connecting the softener outlet 32 to a drain line 38, also terminating above the floor drain 37, and the three-way valve 35 is turned to its second position closing off the drain line 21. As is shown in Fig. 2, the valve 30 is also connected as by piping 39, 40 and 41 to a three-way valve 42. This valve is turned to a position connecting the water supply to the injector pipe 27 by means of a pipe 43, and also by means of piping 44 and 45 to the two agitator connections 28 and 29. Water is thus caused to flow through the injector pipe 27 and the agitator connections 28 and 29 into the interior of the tank 12, and from there through the pipe 16 to the softener 10. The water is passed through the softener and out of the outlet 32 to be discharged finally from the drain line 38.

The zeolite, being slightly heavier than water, tends to settle to the bottom of the cone-shaped portion 14 of the tank 12, where it is caught by the stream of water issuing from the lower end of the injector pipe 27 and entering the lower connection 15 to be thus forced through the pipe 16 and returned to the softener 10. The pipe 16 is preferably fitted with a sight tube section 46 permitting the return of the zeolite to be observed visually. The sight tube 46 also permits visual checking of the progress of the first described washing process.

The agitator connections 28 and 29 are employed to prevent the zeolite from packing in the lower part of the tank bottom, and in order that the flow of water through these connections may be suitably regulated, there is provided in the pipe 43 a throttle or regulating valve 47. The valve 47 is adjusted to provide a sufficient flow to keep the particles of zeolite in motion to prevent packing thereof, but sufficiently low not to interfere with the action of the injector. Ordinarily, it requires from one to two minutes to return all of the zeolite to the softener 10.

When all of the zeolite has been returned to the softener 10, the valve 42 is turned to its second position connecting the pipe 43 to a pipe 48 leading from a salt pot 49, and closing off the water supply from the pipe 41. The salt pot 49, which is connected to the water supply pipe 40 through a shut off valve 50 (now considered to be in the open position), is filled with common salt or sodium chloride. As water flows through the salt pot from the water supply pipe 40, the salt is dissolved and a solution thereof (or brine) is caused to flow through the injector pipe 27, tank 12, and pipe 16, and thence through the bed of zeolite in the softener 10. After leaving the softener, the solution is discharged from the drain line 38. In passing through the bed of zeolite, the salt in solution reacts with the zeolite to effect the regeneration thereof in the well known manner.

It has been found that about eight or ten pounds of salt is required for complete regeneration, and that this amount of salting may be accomplished in about ten minutes by maintaining a flow of about one and one half gallons per minute for about five minutes followed by a period of about five minutes during which the flow is arrested. The arresting of the flow after the first five minute period is accomplished by turning the valve 42 to its third position closing off both of the pipes 41 and 48.

After the five minute rest period above mentioned, the three-way valve 35 is turned to its third position to connect the water supply pipe 39 to the drain line 21, thus causing water to enter the tank 12, pass through the tank and into the softener 10 by way of the pipe 16, the water leaving the softener 10 being discharged through the drain line 38. This operation, which serves to rinse out the tank 12 and to wash from the bed of zeolite any excess of salt remaining, is continued until a test for salt of the water issuing from the drain line 38 shows a negligible concentration. This usually requires about five minutes of rinsing.

At the conclusion of the rinsing operation, all valves are turned to their off positions, the hoses 17 and 33 are disconnected, and the softener 10 is moved away to make room for the next softener to be regenerated, the regenerated softener 10 now being in a condition to be placed in service once more.

The above operation has been described with reference to a single softener 10. However, in accordance with this invention, it is intended to treat a plurality of softeners simultaneously, as is represented in Fig. 1. This is accomplished by providing three paralleling connections 51, 52, and 53 as shown in Fig. 2. The connection 51 serves to connect the outlets 32 of all of the softeners to the three-way valve 31 so that during the reverse flow washing operation, water is conducted from the valve 31 to all of the softeners, and so that during the remainder of the operations flow from all of the softener outlets is collected and passed through the valve 31 to the drain line 38. In a similar way, the connection 52 serves to parallel all of the drain lines 21, while the connection 53 serves to parallel all of the injector and agitator lines for causing the return of the zeolite to the softeners and for the salting operation.

From the above description of the operation of the system, it is seen that it is not necessary to move or otherwise handle the softeners from the time they are connected into the system until they are ready to be taken away completely regenerated and ready for service. It will also be seen that the entire process consumes about twenty-five minutes, exclusive of the time required to connect and disconnect the softeners from the system. The connection time is reduced to a minimum by the use of the quick-acting snap-on couplings 19 and 34, and it is estimated that by treating eight softeners simultaneously the time required per softener treated may be as little as six minutes including the handling time.

It is desired to emphasize that this economy in handling and in time consumed is made possible by the use in the system of the washing tank 12 which is constructed as a pressure vessel to operate under pressure, as distinguished from the open funnel-like vessels previously used. The use of a pressure system permits use of the injector type of apparatus for returning the zeolite to the softener after the washing operation, and also permits the piping to be so arranged as to effect all of the required operations without necessitating the disconnection or moving of the softener during the regenerating process. Attention is directed particularly to the novel construction of the washing tank 12 and the incorporation therein of the baffle member 23, the injector pipe 27, and the agitator connections 28 and 29.

While there has been described the preferred embodiment of this invention, the same is not to be limited to the details shown and described except as defined in the appended claims.

I claim:

1. A washing tank for use in regenerating water softeners comprising a closed cylindrical vessel, the lower end of which is tapered to define a lower portion of inverted cone shape, said cone being provided with an opening at the apex affording a connection to said softener; a baffle member in said vessel having the form of two cones placed base to base, said baffle member being disposed in said lower portion in a position extending one of said cones in parallel spaced relation to said lower portion; and an injector pipe extending into said vessel and downwardly through said baffle member terminating near said opening and in alignment therewith.

2. A washing tank for use in regenerating water softeners comprising a closed cylindrical vessel, the lower end of which is tapered to define a lower portion of inverted cone shape, said cone being provided with an opening at the apex affording a connection to said softener; an injector pipe extending into said vessel and downwardly therethrough terminating near said opening and in alignment therewith; and agitator connections extending through said lower portion near said opening in a position such that water flowing through said connections will agitate solid material in said vessel near said opening.

3. An apparatus for backwashing a softener containing zeolite and having inlet and outlet connections, comprising a closed cylindrical vessel, the lower end of which is tapered to define a lower portion of inverted cone shape, said cone being provided with an opening at the apex affording a connection to said softener; a cone-shaped baffle member disposed in said lower portion of said vessel in a position extending said baffle member in parallel spaced relation to said lower portion; an injector pipe extending into said vessel and downwardly through said baffle member terminating near said opening and in alignment therewith; quick-acting means for connecting said inlet to said opening at the apex of said cone; means for supplying water under pressure to said outlet to force at least a part of the zeolite into said tank and to produce a flow of water through said softener and said tank to wash the zeolite therein; and means for supplying water under pressure to said injector pipe to thereby produce a flow of water from said tank to said softener carrying said zeolite back to said softener.

4. An apparatus for backwashing a softener containing zeolite and having inlet and outlet connections comprising a closed cylindrical vessel, the lower end of which is tapered to define a lower portion of inverted cone shape, said cone being provided with an opening at the apex affording a connection to said softener; a baffle member in said vessel having the form of two cones placed base-to-base, said baffle member being disposed in said lower portion in a position extending one of said cones in parallel spaced relation to said lower portion; an injector pipe extending into said vessel and downwardly through said baffle member terminating near said opening and in alignment therewith; quick-acting means for connecting said inlet to said opening at the apex of said cone; means for supplying water under pressure to said outlet to force at least a part of the zeolite into said tank and to produce a flow of water through said softener and said tank to wash the zeolite therein; means for supplying water under pressure to said injector pipe to thereby produce a flow of water from said tank to said softener carrying said zeolite back to said softener; agitator connections extending through said lower portion near said opening in a position such that water flowing through said connections will agitate solid material in said tank near said opening; and means for regulating the flow of water through said agitator connections in relation to the flow through said injector pipe.

WESLEY K. ZIEGELMAN.

REFERENCES CITED

The following references are of record in the file of this patent:

UNITED STATES PATENTS

| Number | Name | Date |
|---|---|---|
| 1,007,929 | Deacon | Nov. 7, 1911 |
| 1,177,849 | De Kalb | Apr. 4, 1916 |
| 1,539,671 | Holland et al. | May 26, 1925 |
| 1,578,221 | Vachier | Mar. 23, 1926 |
| 1,671,864 | Higgins | May 29, 1928 |
| 1,688,915 | Astrom | Oct. 23, 1928 |
| 1,752,339 | Green | Apr. 1, 1930 |
| 1,763,784 | Hodkinson | June 17, 1930 |
| 1,814,212 | Grover | July 14, 1931 |
| 1,909,656 | Buquor | May 16, 1933 |